United States Patent [19]

Bjorklund et al.

[11] Patent Number: 4,458,345
[45] Date of Patent: Jul. 3, 1984

[54] PROCESS FOR OPTICAL INFORMATION STORAGE

[75] Inventors: Gary C. Bjorklund; Donald M. Burland, both of Los Gatus, Calif.

[73] Assignee: International Business Machines Corporation, Armonk, N.Y.

[21] Appl. No.: 364,160

[22] Filed: Mar. 31, 1982

[51] Int. Cl.³ ............................ G03C 5/04; G11B 7/00
[52] U.S. Cl. ...................................... 369/103; 358/347; 369/121; 369/125; 365/119; 365/125; 350/3.61
[58] Field of Search ............... 358/342, 345, 347; 369/100, 103, 121, 125; 430/1, 2; 350/3.61; 365/106, 119, 125; 346/107 R

[56] References Cited

U.S. PATENT DOCUMENTS

| 3,720,921 | 3/1973 | Schools et al. | 365/125 X |
| 3,936,140 | 2/1976 | Ruell | 369/103 X |
| 4,173,823 | 11/1979 | Pekau et al. | 369/103 X |
| 4,339,513 | 7/1982 | Alvarez et al. | 350/3.61 X |

Primary Examiner—Robert L. Richardson
Attorney, Agent, or Firm—Joseph G. Walsh

[57] ABSTRACT

Information is stored by a process involving the steps of
(1) sensitizing a recording medium comprising a two-photon, four-level material by exposing said medium to flood illumination with ultra-violet or visible light, and then
(2) exposing the sensitized medium simultaneously to two beams of coplanar laser irradiation intersecting within said recording medium to create a microscopic interference pattern.

5 Claims, 4 Drawing Figures

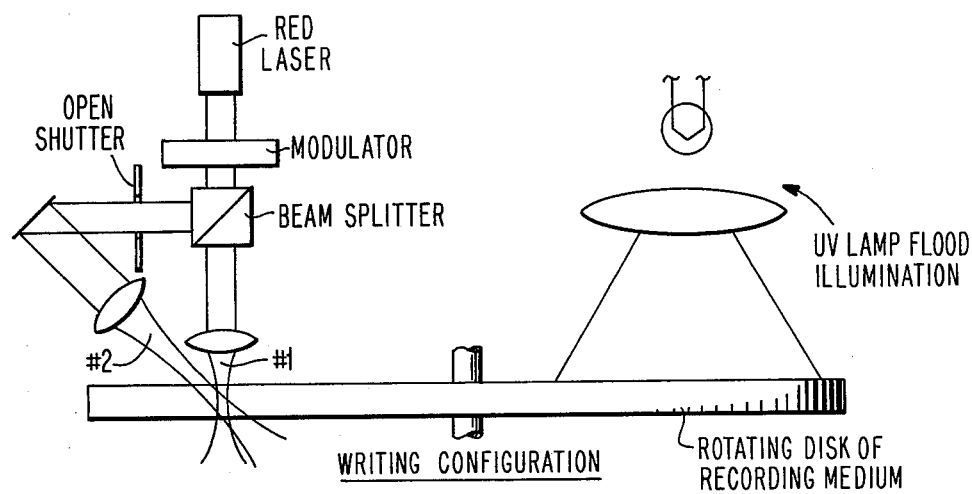
FIG.1a
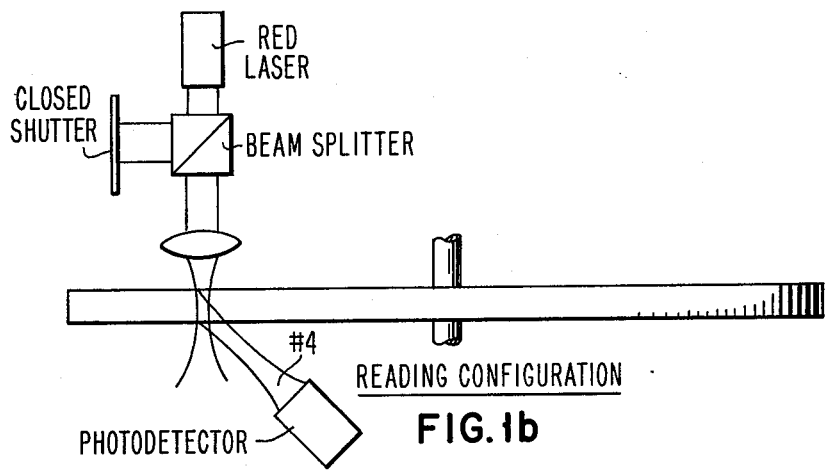
FIG.1b
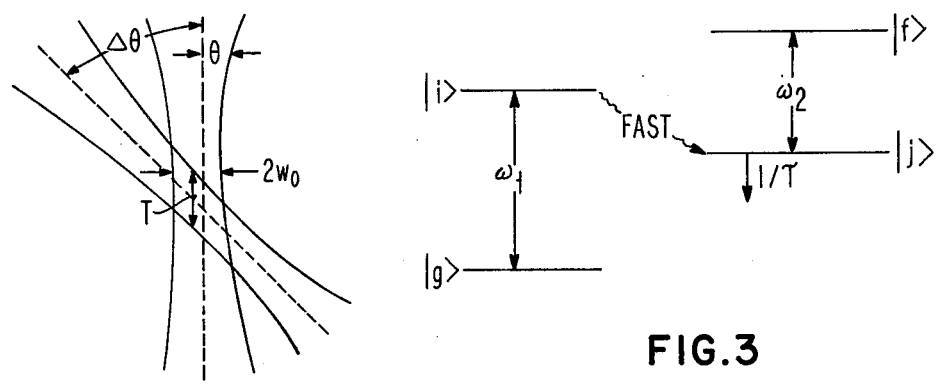
FIG.2
FIG.3

PROCESS FOR OPTICAL INFORMATION STORAGE

DESCRIPTION

1. Technical Field

The present invention is concerned with an optical process for storing information. In particular it is concerned with a process wherein information is stored in the form of microscopic interference patterns imprinted into a two-photon, four-level material.

2. Background Art

U.S. patent application Ser. No. 06/208,740, filed Nov. 20, 1980 now U.S. Pat. No. 4,339,513, shows the use of a two-photon, four-level material to make a hologram. U.S. patent application Ser. No. 06/316,156, filed Oct. 28, 1981, shows other materials also useful for that purpose. Neither of these applications, however, shows the process steps required by the present invention.

DISCLOSURE OF THE INVENTION

The present invention is a method for optical information storage wherein each bit of information is stored by the presence (a logical "1", for example) or absence (a logical "0", for example) of a microscopic interference pattern at a particular spatial location in a two-photon, four-level recording medium. The essential elements of the method are illustrated by the particular embodiment shown in the drawings.

BRIEF DESCRIPTION OF THE DRAWINGS

FIG. 1, consisting of 1a and 1b (not to scale) is a diagram of one embodiment of the present process in which the recording medium is configured as a rotating disk;

FIG. 2 (not to scale) is an enlargement of the region of interference produced by the two laser beams within the recording medium during the writing step;

FIG. 3 is a typical energy level diagram for a two-photon, four-level material.

As may be seen from inspection of FIG. 1, the output of the continuous-wave (CW) red or infrared laser is first passed through an amplitude modulator and then split into two separate beams (#1 and #2) by a beam splitter.

For writing, the shutter is opened; both beams pass through focusing lenses, and then intersect at an angle of about 22° or greater in the recording medium. The dimensions of the resulting volume of microscopic interference pattern are about 4 $\mu$m×4 $\mu$m×10 $\mu$m. Beams #1 and #2 are coplanar with the axis of rotation of the disk so that the interference fringes are parallel to the direction of motion of the medium. This permits recording of information in a moving medium. Sensitization of the recording medium to the red laser radiation is accomplished by exposure to flood illumination with ultra violet or visible light. The lifetime of the illumination produced sensitization (<1 msec) can be much longer than the period of rotation of the disk, so that the region of UV exposure may be spatially removed from the region where the focused red laser light hits the medium. Binary data is recorded by modulating the red laser intensity. At full intensity, a micro-interference pattern is recorded, while at zero intensity, none is produced.

For reading, the UV or visible illumination is shut off and the shutter is closed so that each potential micro-interference location is illuminated by a single reading beam (beam #3) from the red laser. The red laser beam is not amplitude modulated. The reading beam has an identical phase-front to one of the beams (beam #1) utilized to write the micro-interference pattern and thus satisfies the criteria for efficient diffraction. Whenever a micro-interference pattern is present in the region probed by the reading beam, light is diffracted to form an image beam (beam #4) with an identical phase front to beam #2. The light in beam #4 is angularly resolved from the reading beam and thus a properly positioned photodiode will produce a signal when a micro-interference is present and no signal when none is present. Thus reading of the data is accomplished against zero background.

Recording at several discrete depths beneath the surface of the recording medium is accomplished by altering the angle between beams #2 and #1 for each depth. The reading configuration then utilizes several photodiodes, each positioned to monitor the image beam from micro-interference patterns at the corresponding depths.

As an aid to understanding the invention, the following explanation is offered. FIG. 2 shows a blow-up of the volume of interference produced by beams #1 and #2 during the writing step. Assuming that the beams are focused to a beam waist radius $w_o=2$ $\mu$m ($w_o$ is the radius where the beam intensity falls off by $1/e^2$) and that $\lambda=0.8$ $\mu$m, then the depth of focus is given by the confocal parameter $b=2\pi w_o/\lambda=30$ $\mu$m and the beams spread out with a far field diffraction angle $\theta=\lambda w_o=0.13$ rad. In order for the image beam to be separated with good signal-to-noise from the reading beam, it is necessary that the angle between beams #1 and #2 be given by $\Delta\theta \geq 3\theta=0.39$ rad (22°). The thickness T of the micro-interference pattern is then given by $T=2w_o/\tan \Delta\theta=10$ $\mu$m.

The diffraction efficiency $\eta$ of the recorded micro-interference pattern is given $$\eta \approx \left[ \frac{\pi n_1 T}{\lambda} \right]^2 \tag{1}$$

where $n_1$ is the modulation of the index of refraction produced by the photochemical changes induced in the recording of the fringes. A typical value of n for existing two-photon, four-level organic recording materials in polymer hosts is $2.5 \times 10^{-4}$. For $T=10$ $\mu$m, $\eta=10^{-4}$. Thus for a 10 mW reading beam, 1 $\mu$W of diffracted power would be incident on the photodiode. Power levels of this magnitude can easily be detected by photodiodes terminated in 50$\Omega$ with $10^8$ Hz bandwidth.

The underlying physical process responsible for two-photon, four-level hologram is shown in FIG. 3 by a typical energy level diagram for such a material. The first step $|g>\rightarrow|i>$ is pumped by radiation at frequency $\omega_1$ with absorption cross section $\sigma_1$, and intensity $I_1$. The intermediate state $|i>$ is assumed to decay rapidly to the second, metastable intermediate state $|j>$ which has a lifetime $\tau$. The second step $|j>\rightarrow|f>$ is pumped by radiation at frequency $\omega_2$ with absorption cross section $\sigma_2$ and intensity $I_2$. The final level $|f>$ is chemically active while the ground state $|g>$ and intermediate levels $|i>$ and $|j>$ are chemically relatively less active. The values of $\omega_1$ and $\omega_2$ are sufficiently different that the $\omega_1$ radiation efficiently pumps only the first step and the $\omega_2$ radiation pumps only the second step. Thus, the two-photon photochemistry occurs only when both frequencies are present. For the application of the present invention, $\omega_1$ is chosen to be in the UV or visible and $\omega_2$ to be in the red or infrared.

The necessary time to write each micro-interference pattern can be estimated from the formula $$K = \left[\frac{I_1 \sigma_1 \tau}{\hbar \omega_1}\right] \left[\frac{I_2 \sigma_2}{\hbar \omega_2}\right] \qquad (2)$$

where K is the rate of the two-photon photochemical process in units of $sec^{-1}$. Typical values for the first step are $\sigma_1 = 10^{-17}$ cm$^2$, $\hbar\omega_1 = 5 \times 10^{-19}$J. $I_1 = 250$ mW/cm$^2$, $\tau = 100$ msec. This value of $I_1$ is sufficient to cause the first term to be on the order of unity and can easily be produced by incoherent UV lamp sources. A further increase in the value of $I_1$ causes no further increase in K since complete pumping of the molecular population into level $|j\rangle$ has already been achieved. Typical values for the second step are $\sigma_2 = 5 \times 10^{-17}$ cm$^2$, $\hbar\omega_2 = 2 \times 10^{-19}$J and $I_2 = 8 \times 10^4$ W/cm$^2$. The $I_2$ value is obtained by assuming 10 mW of power for the writing laser and a focal area $A = \pi w_o^2 = 1.2 \times 10^{-7}$ cm$^2$. Substitution in Eq(2) yields $K = 2 \times 10^7$ sec$^{-1}$. Thus, nearly all of the molecules at the fringe intensity maxima will undergo two-photon chemistry in 50 nsec. The red energy density required is 4 mJ/cm$^2$.

The recording medium is conveniently made of a polymeric matrix containing a two-photon, four-level material. The polymer should be transparent to the light being used. Suitable polymers include, for example, polyvinyl carbazole, polystyrene, phenolic resins and acrylic resins. Suitable two-photon, four-level materials include, for example, tetrazine compounds and $\alpha$-diketone compounds such as biacetyl, camphorquinone and benzil.

The present invention has several advantages over the prior art. The micro-patterns are recorded below the surface of the medium. This provides immunity against destruction of the stored information by surface corrosion. The gating property of the two-photon photochemistry makes possible true nondestructive reading. Since the patterns are self-developing, no wet processing is required, and the memories so constructed are postable. Patterns can be produced at several depths below the surface, increasing the bit density. The polymer host material makes possible the fabrication of disks at low cost. Furthermore, reading is accomplished against zero background signal.

We claim:
1. A process for storing information characterized by the steps of:
    (1) sensitizing a recording medium comprising a two-photon, four-level material by exposing said medium to flood illumination with ultra-violet or visible light, and then
    (2) exposing the sensitized medium simultaneously to two beams of coplanar laser irradiation intersecting within said recording medium to create a microscopic interference pattern.
2. A process as claimed in claim 1 wherein said recording medium is configured as a rotating disk.
3. A process as claimed in claim 2 wherein the two laser beams are coplanar with the axis of rotation of the recording disk.
4. A process as claimed in claim 1 wherein the two beams of coplanar laser irradiation intersect below the surface of the recording medium.
5. A process as claimed in claim 4 wherein the storing process is repeated a plurality of times, each time at a different depth below the surface of the medium.

* * * * *